March 10, 1936.　　　R. SELQUIST ET AL　　　2,033,654
MAGNETIC MEASUREMENT
Filed Oct. 9, 1933
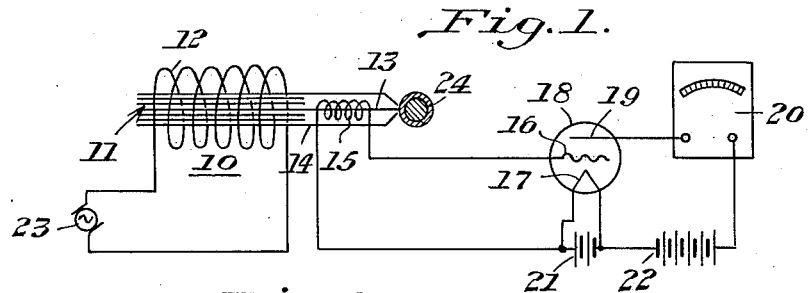
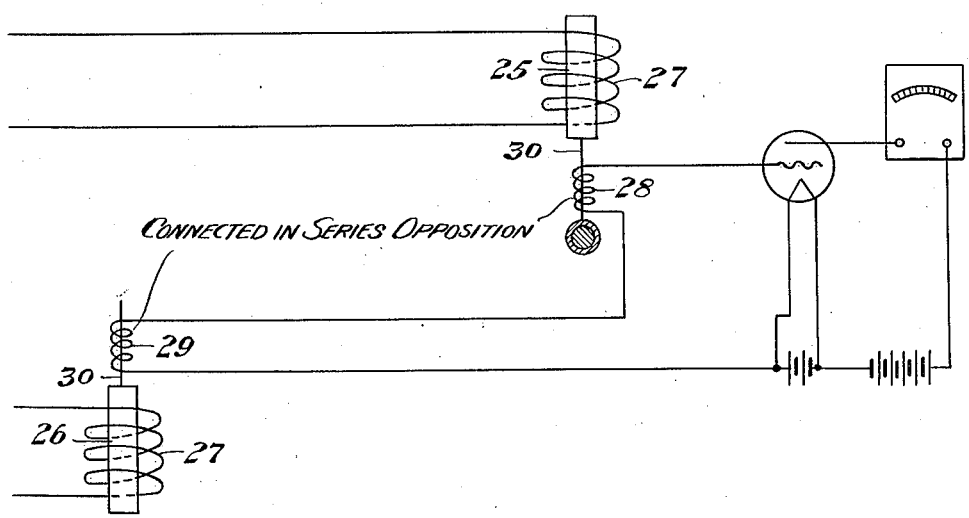
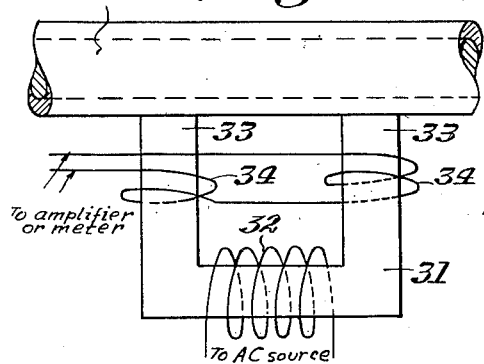
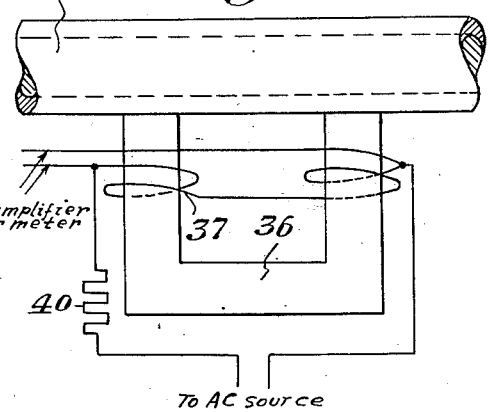
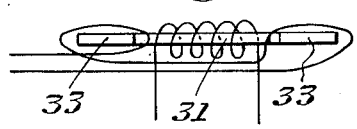
INVENTORS
Rolf Selquist, Ralph Overholt, Jr., & Jno. H. Gordon
by their attorneys
Byrnes, Stebbins, Parmelee & Blenko Patented Mar. 10, 1936

2,033,654

UNITED STATES PATENT OFFICE 2,033,654

MAGNETIC MEASUREMENT

Rolf Selquist, McKeesport, and Ralph Overholt, Jr., and John H. Gordon, Pittsburgh, Pa., assignors to Copperweld Steel Company, Glassport, Pa., a corporation of Pennsylvania Application October 9, 1933, Serial No. 692,734

7 Claims. (Cl. 177—351)

Our invention relates to magnetic measurements and, in particular, to the testing or measurement of composite metal articles having at least one element composed of magnetic material.

A specific application of the invention is the determination of the thickness of an exterior coating of a metal, such as copper, deposited on a magnetic core, for example, an iron rod or wire. While the invention will be described more specifically hereinafter with reference to this particular application thereof, it will immediately be recognized that the invention is also applicable to other uses, for example, the determination of the thickness of the zinc coating on a galvanized sheet, or the thickness of any non-magnetic material having a magnetic backing, or the distance between a point of reference and a magnetic mass.

The methods used heretofore for determining the thickness of a layer deposited upon a wire base have been characterized by many objections, for example, the length of time required, the destructive effect upon the specimen, the accuracy of the result and the cost of obtaining it. We have invented a method and apparatus for testing composite articles which is capable of indicating the thickness of a coating deposited upon a magnetic base in a very short time, without any injurious effect on the specimen, with considerable accuracy and very low cost.

In accordance with our invention, we provide a transformer preferably having an open core with an extended portion of reduced cross-section constituting a probe. The transformer has a primary or exciting winding on the body of the core. A small secondary, exploring or pick-up coil is wound around the probe. A small voltage is induced in this secondary coil and appears across the terminals thereof. When the probe is placed adjacent to a mass of magnetic material, the decrease in reluctance of the magnetic path through the secondary coil results in an increase of the flux threading the secondary coil and the voltage thereacross is likewise increased. The voltage across the secondary coil may be indicated by appropriate instruments and serves as an indication of the distance between the end of the probe and the magnetic mass or, in the case of a bi-metallic wire or sheet having a ferrous base, for example, it indicates the thickness of the coating thereon.

For a complete understanding of the invention, reference is made to the accompanying drawing illustrating a present preferred embodiment of the invention and certain modifications thereof. In the drawing:

Figure 1 is a circuit diagram illustrating one form of the invention;

Figure 2 is a circuit diagram illustrating a slightly different modification;

Figure 3 is a partial diagram similar to Figures 1 and 2 illustrating a further modification;

Figure 3A is a plan view of the apparatus shown in Figure 3; and

Figure 4 is a partial diagram illustrating a further modification.

Referring now in detail to the drawing and, for the moment, to Figure 1, we employ an electromagnet 10 having a core 11, an exciting coil 12 and a probe 13. The probe constitutes merely an extension of the core 11, with a reduced cross-section. A shield 14 extends from the core 11 around the probe 13.

A secondary coil 15 is wound around the probe 13. The terminals of the coils 15 are connected to the grid 16 and filament 17 of an amplifying tube 18. The output of the tube 18 is delivered from the plate 19 thereof to an indicating instrument, such as a milliammeter 20. The usual A and B batteries for the tube 18 are shown at 21 and 22.

The coil 12 of electromagnet 10 is connected to a source of alternating current indicated at 23. The coil 12, obviously, induces an alternating flux in the core 11. A large preponderance of the flux induced in the core 11 traverses a return path from one end of the core to the other through the air. A small portion of the flux, however, traverses the probe 13 and, from the end thereof, returns to the other end of the core through the air. The shield 14 prevents leakage of flux from the probe intermediate its end and the adjacent end of the core.

The small flux traversing the probe 13 obviously induces a voltage in the coil 15. The existence of this voltage across the terminals of the coil 15 causes the amplifier tube 18 to deliver a predetermined output, which is indicated by the instrument 20. The conditions described above obtain as long as there is not any external magnetic material in the neighborhood of the core or probe.

The introduction of magnetic material into the neighborhood of the probe will obviously lower the reluctance of the magnetic path therethrough and increase the flux traversing the coil 15. If the probe 13 is placed in contact with the surface of a bi-metallic article, such as a copper-coated, iron rod or wire 24, therefore, the magnetic properties of the core will increase the flux traversing the probe 13 and the voltage across the coil 15. This change in the voltage across the coil 15 is immediately indicated by a change in the output of the tube 18 and the reading of the instrument 20.

We have found that, as long as the cross-section of the probe is small as compared to the cross-section or mass of the magnetic portion of the specimen, the effect of the presence of the latter in contact with the probe is proportional to the distance between the magnetic portion of the article and the end of the probe, and is not appreciably affected by the size of the magnetic portion of the specimen. The reading of the instrument 20, therefore, either indicates or shows directly the thickness of the coating on the ferrous core in the case of the copper-coated, iron rod. Obviously, the thinner the coating the smaller the distance between the probe and the magnetic portion of the rod, and the greater the additional induced flux and the reading of the instrument 20.

Figure 2 is a diagram illustrating a different embodiment of the invention. According to this embodiment, we employ a pair of magnets 25 and 26 similar in every respect to the magnet 10. The windings of the magnets 25 and 26 shown at 27 may be connected in series or in parallel to any convenient source of alternating current. The inducing coils 28 and 29 mounted on the probes 30 of the magnets 25 and 26, are connected in series opposition, that is, the polarity of one coil is reversed relative to that of the other. In using the system shown in Figure 2, the probe of only one of the magnets is applied to the specimen. Before applying the probe of either magnet, it will be apparent that conditions will be balanced if the two units of the system are identical in structure. There will thus be no reading shown on the instrument 20. When the probe of one of the magnets is applied to the specimen, however, the balance is disturbed and a reading of the indicating instrument is observed. The system of Figure 2, while it is theoretically the same as that of Figure 1, is preferred in practice because the difference between the voltages induced in the coils 28 and 29, which is small at best even when amplified, can be read more accurately than can the change in the voltage across the coil 15 when the probe is applied to the specimen.

Figure 3 illustrates a further modification of the invention in which a U-shaped magnetic member 31 constitutes both a magnet core and a probe. An exciting winding 32 on the member 31 corresponds to the exciting windings 12 and 27 of the magnets 10, 25, and 26. The free ends 33 of the member 31 constitute twin probes and carry windings 34 corresponding to the windings 15, 28, and 29. As shown, the windings 34 on the probes 33 are connected in series. The device of Figure 3 may be connected in a circuit similar to either of those shown in Figures 1 and 2. As long as the probes 33 are remote from a specimen, such as the copper-coated, iron wire 35, the reluctance of the magnetic circuit through the member 31 and the airgap between the probes is fairly high and the voltage across the terminals of the windings 34 is thus rather small. When the probes 33 are placed against the surface of the wire 35 shown in Figure 3, the reluctance of the magnetic path is decreased, the flux through the member 31 is increased, and the voltage across the terminals of the windings 34 increased in the same proportion. If the apparatus of Figure 3 is used in a circuit such as that of Figure 2, of course, an additional magnetic member 31 with windings 32 and 34 is provided, as shown in Figure 2.

Figure 4 shows still another modification of the invention in which a magnetic member 36 similar to that shown at 31 in Figure 3 is provided with a winding 37. This winding combines the functions of the windings 32 and 34 of Figure 3 and serves both as an exciting winding and as an exploring winding. It is connected to any convenient alternating current source. The current traversing the winding 37, of course, depends on the reluctance of the magnetic circuit through the member 36, in the same manner as the voltage across the coil 15 depends on the reluctance of the magnetic circuit through the probe 13. Placing the ends of the member 36 in contact with the surface of a copper-coated, iron wire, such as that shown at 38, varies the current traversing the windings 37. An amplifier tube (not shown) may have its input circuit connected across a resistor 40 in series with the winding 37 to indicate the change in the voltage drop across the resistor 40 due to the presence of the bi-metallic rod 38. The output of the amplifier tube may be read by an instrument such as shown at 20 in Figure 1 and an indication obtained of the thickness of the copper coating on the rod 38, in the manner already explained.

It will be apparent from the foregoing, we believe, that our invention provides a novel and highly useful method and apparatus for testing bi-metallic articles and particularly for the purpose of determining the thickness of a non-magnetic coating on a magnetic base. The apparatus involved is simple and inexpensive. The method is rapid and can be performed by comparatively unskilled labor. The cost is negligible. The accuracy of the invention has been found to compare very favorably with that of the prior methods, the objections to which have already been noted.

Since the invention permits a ready determination of the thickness of a coating on a magnetic base, it lends itself to use in checking the concentricity of the base and the coating, in the case of round articles, such as rods or wire. By moving the probe around the circumference of an article of this kind, or by holding the probe still and rotating the article, eccentricity of the base and coating will be evidenced by a change in the reading of the indicating instrument.

Although we have illustrated and described herein but one preferred embodiment of the invention and its mode of practice, together with certain modifications thereof, it will be apparent that the method and apparatus described herein may be varied without departing from the spirit of the invention or the scope of the appended claims.

We claim:

1. Magnetic apparatus for measuring relatively small distances, for example, the thickness of a non-magnetic coating on a magnetic base, said apparatus comprising a core, a probe of reduced cross-sectional area relative to the core, extending from one end of the core and adapted to engage the coating, a primary coil on the core, and a secondary coil on the probe.

2. Magnetic apparatus for measuring relatively small distances, for example, the thickness of a non-magnetic coating on a magnetic base, said apparatus comprising a core, a probe of reduced cross-sectional area relative to the core, extending from one end of the core and adapted to engage the coating, a primary coil on the core, a secondary coil on the probe, and a magnetic shield extending from the same end of the core as said probe and disposed adjacent thereto, said shield extending toward the probe adjacent the end thereof, the ends of the shield and probe being substantially in a common plane normal to the axis of the probe.

3. A magnetic apparatus for measuring relatively small distances comprising a core, an exciting winding thereon, a probe extending from the core and having a relatively small cross-sectional area compared to that of the core, a secondary winding on said probe, and a magnetic shield extending coaxially of the core, overlying the probe, and substantially enclosing the latter, whereby flux is induced in the probe and shield in the same direction, and the shield tends to concentrate the flux in the probe and prevent leakage of flux therefrom, said shield lying close to the probe at least adjacent the end of the latter, and being substantially co-terminous therewith.

4. Magnetic apparatus for measuring relatively small distances comprising a core, a probe of small cross-sectional area compared to that of the core projecting from one end of the latter, a magnetic shield substantially enclosing the proble, lying close thereto at least adjacent its extreme end and being substantially co-terminous therewith, an exciting winding on the core and a secondary winding on said probe, whereby the magneto-motive force of the exciting winding induces flux in said probe and shield in the same direction.

5. A device for measuring relatively small distances from a magnetic material, comprising a core, an exciting coil therefor, a probe extending from the core, a secondary coil on the probe adapted to be connected to a voltage or current indicating means whereby to measure the flux traversing the probe, and a shield substantially enclosing the probe and having the same magnetic polarity as the probe, said shield converging upon the probe adjacent its end and being substantially co-terminous therewith.

6. Magnetic testing apparatus comprising a laminated magnetic core, an exciting coil thereon, a probe of magnetic material extending from one end of the core, said probe having a much smaller cross-sectional area than said core, a secondary coil on said probe, a magnetic shield constituted by outer laminations of said core extending from the same end thereof as the probe, overlying the probe and converging toward the probe adjacent the end of the latter, to limit the leakage of flux from the intermediate portions of the probe, and means for indicating the voltage induced in said secondary coil, said shield and probe being substantially co-terminous.

7. The apparatus defined by claim 6 characterized by a second core similarly provided with an exciting coil, a probe and a secondary coil thereon, the two secondary coils being connected in opposition to said voltage indicating means.

ROLF SELQUIST.
RALPH OVERHOLT, JR.
JOHN H. GORDON.